(12) United States Patent
Gomi

(10) Patent No.: US 10,076,919 B2
(45) Date of Patent: Sep. 18, 2018

(54) SPECTROMETRY DEVICE, IMAGE FORMING APPARATUS, AND SPECTROMETRY METHOD

(71) Applicant: Seiko Epson Corporation, Tokyo (JP)

(72) Inventor: Tsugio Gomi, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/080,977

(22) Filed: Mar. 25, 2016

(65) Prior Publication Data

US 2016/0279991 A1    Sep. 29, 2016

(30) Foreign Application Priority Data

Mar. 26, 2015 (JP) ................. 2015-064978

(51) Int. Cl.

| *B41J 29/38* | (2006.01) |
| *G01J 3/02* | (2006.01) |
| *G01J 3/26* | (2006.01) |
| *G01J 3/50* | (2006.01) |
| *G01J 3/52* | (2006.01) |
| *G01B 11/14* | (2006.01) |
| *G01J 3/06* | (2006.01) |

(52) U.S. Cl.

CPC ........... *B41J 29/38* (2013.01); *G01B 11/14* (2013.01); *G01J 3/0278* (2013.01); *G01J 3/0291* (2013.01); *G01J 3/06* (2013.01); *G01J 3/26* (2013.01); *G01J 3/50* (2013.01); *G01J 3/524* (2013.01)

(58) Field of Classification Search

USPC ....................................................... 356/73
See application file for complete search history.

(56) References Cited

U.S. PATENT DOCUMENTS

| 5,831,740 A | 11/1998 | Terauchi | |
| 5,894,353 A * | 4/1999 | Hotta | G01J 3/50 |
| | | | 356/429 |
| 6,862,092 B1 * | 3/2005 | Ibsen | G01J 3/00 |
| | | | 356/328 |

(Continued)

FOREIGN PATENT DOCUMENTS

| JP | H09-288007 A | 11/1997 |
| JP | 2010-210456 A | 9/2010 |

(Continued)

OTHER PUBLICATIONS

Extended European Search Report for Application No. EP 16 16 2315 dated Aug. 26, 2016 (7 pages).

*Primary Examiner* — Tarifur Chowdhury
*Assistant Examiner* — Omar Nixon
(74) *Attorney, Agent, or Firm* — Harness, Dickey & Pierce, P.L.C.

(57) ABSTRACT

A printer that incorporates a spectrometry device includes a spectroscope, a distance measurer, and a spectrometry unit. The spectroscope includes a wavelength-selective interference filter on which light from a position of measurement in a medium is incident. The distance measurer measures the distance between the position of measurement and the spectroscope, and the spectrometry unit performs spectrometry at the position of measurement by using the spectroscope and correct a measured value obtained by the spectrometry based on the measured distance.

13 Claims, 10 Drawing Sheets

(56) References Cited

U.S. PATENT DOCUMENTS

| | | | |
|---|---|---|---|
| 2003/0062463 A1* | 4/2003 | Narita | B82Y 20/00 250/201.3 |
| 2003/0169421 A1* | 9/2003 | Ehbets | G01J 3/02 356/328 |
| 2004/0109534 A1* | 6/2004 | Uehara | G01N 23/223 378/84 |
| 2006/0192957 A1 | 8/2006 | Frick et al. | |
| 2008/0174763 A1* | 7/2008 | Ehbets | G01J 3/02 356/51 |
| 2008/0273203 A1 | 11/2008 | Miyahara | |
| 2012/0238840 A1* | 9/2012 | Hashimoto | G01N 21/658 600/310 |
| 2013/0258368 A1* | 10/2013 | Shigemoto | H04N 1/00082 358/1.9 |
| 2013/0308134 A1 | 11/2013 | Hirokubo | |
| 2014/0267459 A1 | 9/2014 | Kanai | |

FOREIGN PATENT DOCUMENTS

| | | |
|---|---|---|
| JP | 2013-238755 A | 11/2013 |
| JP | 2014-206527 A | 10/2014 |

* cited by examiner

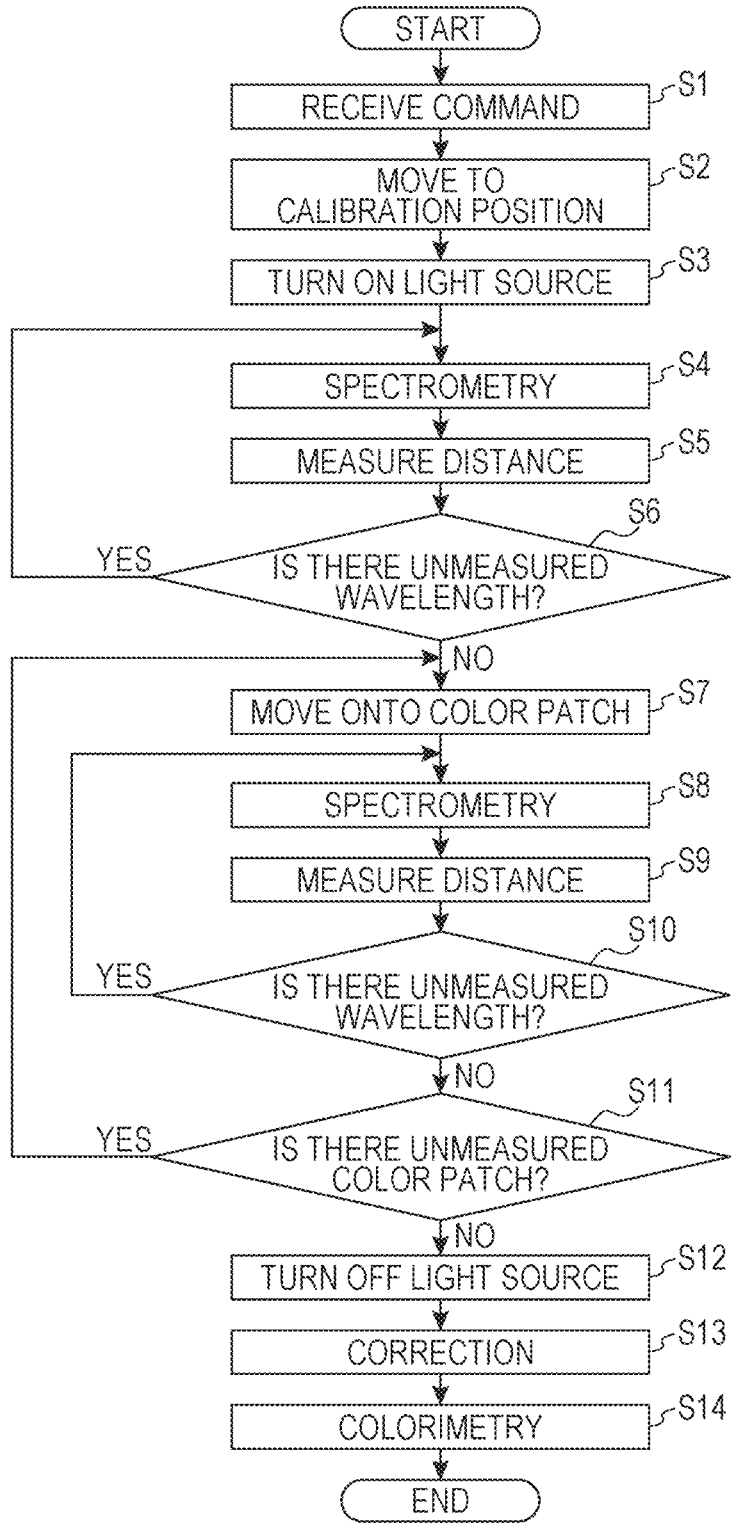

SPECTROMETRY DEVICE, IMAGE FORMING APPARATUS, AND SPECTROMETRY METHOD

BACKGROUND

1. Technical Field

The present disclosure relates to a spectrometry device, an image forming apparatus, and a spectrometry method.

2. Related Art

In the related art, in an image forming apparatus such as a printer, there is known a device that includes a colorimeter measuring the color of an image recorded on a medium. See, for example, JP-A-2013-238755.

The device disclosed in JP-A-2013-238755 includes a recording head that forms (prints) an image on a medium and a colorimetric sensor for measuring the color of the image on the medium. The recording head and the colorimetric sensor are disposed separately, and the colorimetric sensor is pressed by a pressing plate to perform colorimetry on the medium.

The distance between the colorimetric sensor and the medium may be changed by, for example, a ripple on the medium or distortion of a transport path of the medium. As such, if the distance between the colorimetric sensor and the medium is changed, a light intensity distribution is changed at a position of measurement (i.e., in a range of measurement) where the colorimetric sensor performs colorimetry.

For example, if a colorimetry process is performed by irradiating the medium with light from a light source at an angle of incidence of 0° and detecting light reflected at an angle of reflection of 45° with the colorimetric sensor, the position of measurement is changed by a change in the distance between the colorimetric sensor and the medium. The light from the light source with which the medium is irradiated has a large intensity in the central portion thereof and a small intensity in the peripheral portion thereof. Thus, if the position of measurement is shifted, the light intensity distribution at the position of measurement is changed.

In addition, if the colorimetry process is performed by irradiating the medium with light from the light source at an angle of incidence of 45° and detecting light reflected at an angle of reflection of 0° with the colorimetric sensor, a position of irradiation with light from the light source is changed by a change in the distance between the colorimetric sensor and the medium. As described above, since the light from the light source with which the medium is irradiated has a large intensity in the central portion thereof and a small intensity in the peripheral portion thereof, the light intensity distribution at the position of measurement is changed if the position of irradiation is changed.

As such, if the light intensity distribution at the position of measurement is changed (e.g., decreased), the intensity of light received by the colorimetric sensor is also decreased, and measurement accuracy (i.e., color difference $\Delta E$) is decreased if the colorimetry process is performed based on the measured intensity of received light.

SUMMARY

An advantage of some aspects of the present disclosure is to provide a spectrometry device, an image forming apparatus, and a spectrometry method capable of performing a high accuracy spectrometry process.

According to an application example of the present disclosure, there is provided a spectrometry device that includes a spectroscope, a distance measurer, and a spectrometry unit. The spectroscope includes a spectroscopy element on which light from a measurement target is incident. The distance measurer measures the distance between the measurement target and the spectroscope, and the spectrometry unit performs spectrometry on the light by using the spectroscope. The spectrometry unit further corrects a measured value obtained during the spectrometry based on the measured distance.

In the application example, the distance measurer measures the distance between the measurement target and the spectroscope, and the spectrometry unit corrects, based on the distance, the measured value obtained at the time of performing spectrometry on the measurement target using the spectroscope. Accordingly, even if the distance between the measurement target and the spectroscope is changed, a high accuracy colorimetry process can be performed by correcting the measured value according to the distance.

In the spectrometry device of the application example, the spectroscope includes a light source that emits illumination light to the measurement target, and the light reflected by the measurement target is incident on the spectroscopy element. The distance measurer measures the distance by receiving second light resulting from reflection of the illumination light emitted from the light source of the spectroscope by the measurement target.

In the application example, the light source is a common light source used in the spectrometry process performed by the spectroscope and used in the distance measurement performed by the distance measurer. Accordingly, one part of the illumination light emitted to the measurement target from the light source is incident on the spectrometry element of the spectroscope and is used in the spectrometry process, and the other part is incident on the distance measurer and is used in the distance measurement. Therefore, light from a single light source can be utilized in the distance measurement and the spectrometry, and the device is simplified and reduced in size.

In addition, since the light from a single light source that is incident on a predetermined position of measurement in the measurement target is incident on the spectroscope and the distance measurer, the distance measurer can detect the distance between the spectroscope and the position of measurement at which the spectrometry is performed. That is, in a case of measuring the distance between the position separated from the position of measurement and the spectroscope, the distance to the spectroscope may be different from the position of measurement at which the spectrometry is performed and from the position at which the distance measurement is performed because of, for example, a ripple on the measurement target (e.g., paper) or distortion of a transport path. Regarding this matter, in the application example, the measured value is corrected by measuring the distance between the position of measurement, at which the spectrometry is performed by the spectroscope, and the spectroscope with the distance measurer. Thus, the measured value can be appropriately corrected based on the accurate distance between the position of measurement and the spectroscope, and colorimetry accuracy can be improved.

In addition, for example, in a case where a spectrometry light source and a distance measuring light source are used to irradiate the position of measurement with light from each light source, light is incident at the position of measurement at a different angle from each of the different light sources. Generally, in a case of performing a colorimetry process, the angle of incidence of the illumination light at the position of measurement and the angle of reflection of reflected light received by a light receiver are preferably set based on geometrical conditions defined by a color measurement standard (JIS Z 8722). However, as described above, if a distance measuring light source is separately disposed, it is difficult to cause light from the distance measuring light source to be incident at the angle based on the color measurement standard. It is also considered that the distance measuring light source is turned off during the spectrometry. However, in this case, the distance between the measurement target and the spectroscope cannot be measured at the time of performing the spectrometry. Particularly, if the spectrometry is performed by mounting the spectroscope and the distance measurer on one carriage and causing the carriage to scan in a predetermined direction (moving the position of measurement), the position at which the distance measurement is performed is different from the position at which the spectrometry is performed, and correction accuracy is decreased when the measured value is corrected according to the distance.

Regarding this matter, in the application example, both of the spectrometry and the distance measurement are performed by using a single light source. Thus, the spectrometry process can be performed under appropriate geometrical conditions complying with the color measurement standard. In addition, the distance measurer can accurately measure the distance between the spectroscope and the position of measurement at which the spectrometry is performed. Therefore, correction accuracy can be improved when the measured value is corrected according to the distance, and the accuracy in the colorimetry process is also improved.

In the spectrometry device of the application example, the spectrometry unit corrects the measured value based on the distance that is measured by the distance measurer at a time at which the measured value from the spectrometry is obtained.

In the application example, the spectrometry unit corrects the measured value based on the distance measured at the time of obtaining the measured value. In this case, for example, even if the position of measurement is moved by mounting the spectroscope and the distance measurer on a carriage and causing the carriage to scan in a predetermined direction, measurement error is reduced. In addition, since there is no need to stop the carriage at the position of measurement, high speed spectrometry can be performed.

In the spectrometry device of the application example, the spectrometry unit obtains distance-intensity data in which the amount of change in light intensity is recorded with respect to the distance between the measurement target and the spectroscope, and corrects the measured value based on the distance-intensity data.

As described above, if the distance between the measurement target and the spectroscope is changed, the intensity of light that is incident on the spectroscope is also changed and decreased according to the amount of distance change. In the application example, the distance-intensity data in which the amount of change in light intensity is recorded with respect to the distance is obtained at the time of correcting the measured value. Thus, the amount of change in light intensity can be easily obtained with respect to the measured distance, and the measured value can be easily corrected based on the amount of change in light intensity.

In the spectrometry device of the application example, the spectrometry unit obtains the distance-intensity data that corresponds to each of a plurality of wavelengths and corrects the measured value based on the distance-intensity data that corresponds to a wavelength in which spectroscopy is performed by the spectroscopy element.

In the application example, the spectrometry unit corrects the measured value based on the distance-intensity data corresponding to the measured value in each wavelength. Accordingly, each measured value in each wavelength can be corrected to an appropriate value corresponding to the measured distance.

In the spectrometry device of the application example, the spectroscopy element is a wavelength-selective Fabry-Pérot etalon element.

In the application example, a wavelength-selective Fabry-Pérot etalon element is used as the spectroscopy element. Such an etalon element has a low cost and small size in comparison with a case where other spectroscopy elements such as an acousto-optic tunable filter (AOTF) and a liquid crystal tunable filter (LCTF) are used. Thus, the cost and size of the spectrometry device are decreased. In addition, since the spectral wavelength can be changed, spectrometry can be easily performed by a simple configuration on, for example, light of a plurality of wavelengths in a predetermined measurement target wavelength region.

According to another application example of the present disclosure, there is provided an image forming apparatus including the spectrometry device and an image forming unit that forms an image on an image formation target.

In the application example, a reference color image such as a color patch is formed by the image forming unit on the image formation target, and then, high accuracy spectrometry can be performed by the spectrometry device on the reference color image formed. Thus, it is possible to determine with high accuracy whether the color of the reference color image formed is the same as the color that the image forming unit is commanded to form, and, if the colors are different, feedback can be provided to the image forming unit according to a spectrometry result.

According to still another application example of the present disclosure, there is provided a spectrometry method for a spectrometry device including a spectroscope that includes a spectroscopy element on which light from a measurement target is incident and a distance measurer that measures the distance between the measurement target and the spectroscope. The method includes performing a spectrometry process on the light using the spectroscope to obtain a measured value; measuring a distance between the measurement target and the spectroscope with the distance measurer; and correcting the measured value based on the distance.

In the application example, as in the above application examples, the measured value at a position measured by performing the spectrometry is corrected based on the distance between the measurement target and the spectroscope measured by the distance measuring. Accordingly, even if the distance between the measurement target and the spectroscope is changed, a high accuracy colorimetry process can be performed by correcting the measured value according to the distance.

BRIEF DESCRIPTION OF THE DRAWINGS

The present disclosure will be described with reference to the accompanying drawings, wherein like numbers reference like elements.

FIG. 8 is a flowchart illustrating a spectrometry method for the printer of the first embodiment.

DESCRIPTION OF EXEMPLARY EMBODIMENTS

Hereinafter, one embodiment according to the present disclosure will be described based on the drawings. In the present embodiment, hereinafter, a printer 10 (ink jet printer) that includes a spectrometry device will be described as an example of an image forming apparatus of the present disclosure.

Schematic Configuration of Printer

Figure 1:
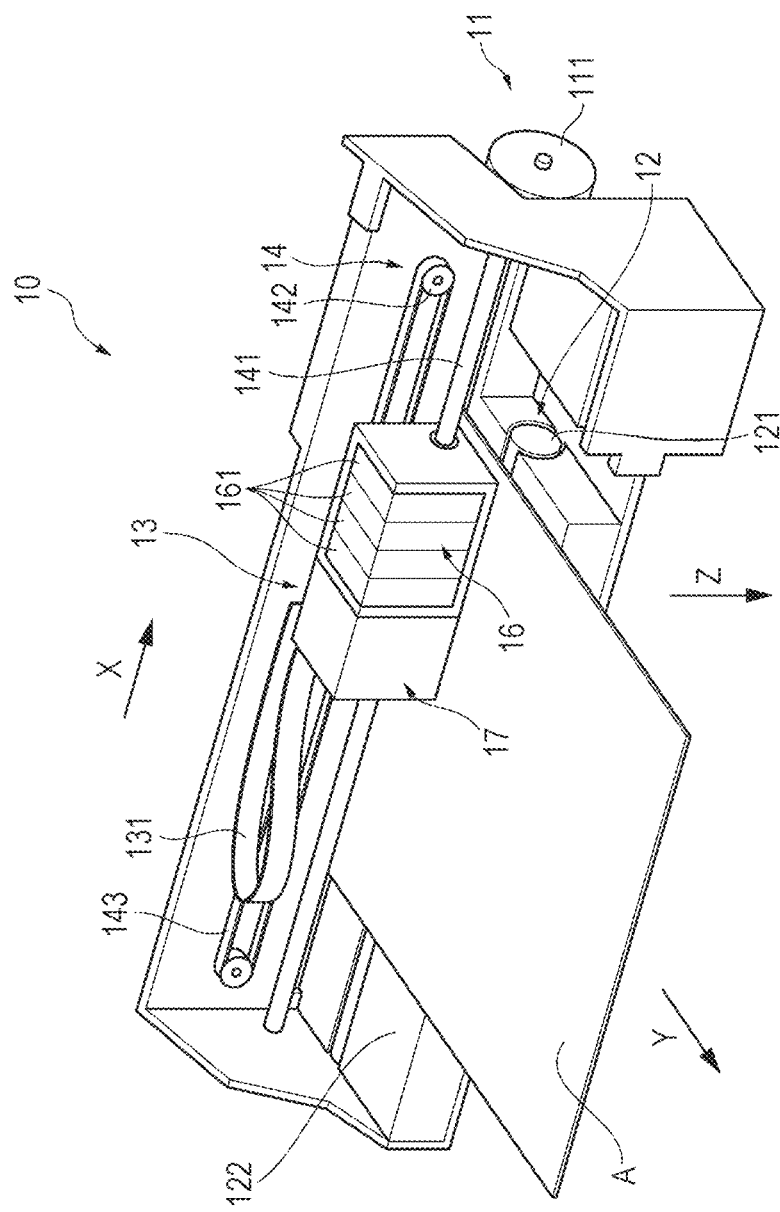
FIG. 1 is a perspective view illustrating an exterior configuration of a printer of a first embodiment according to the present disclosure.
Figure 2:
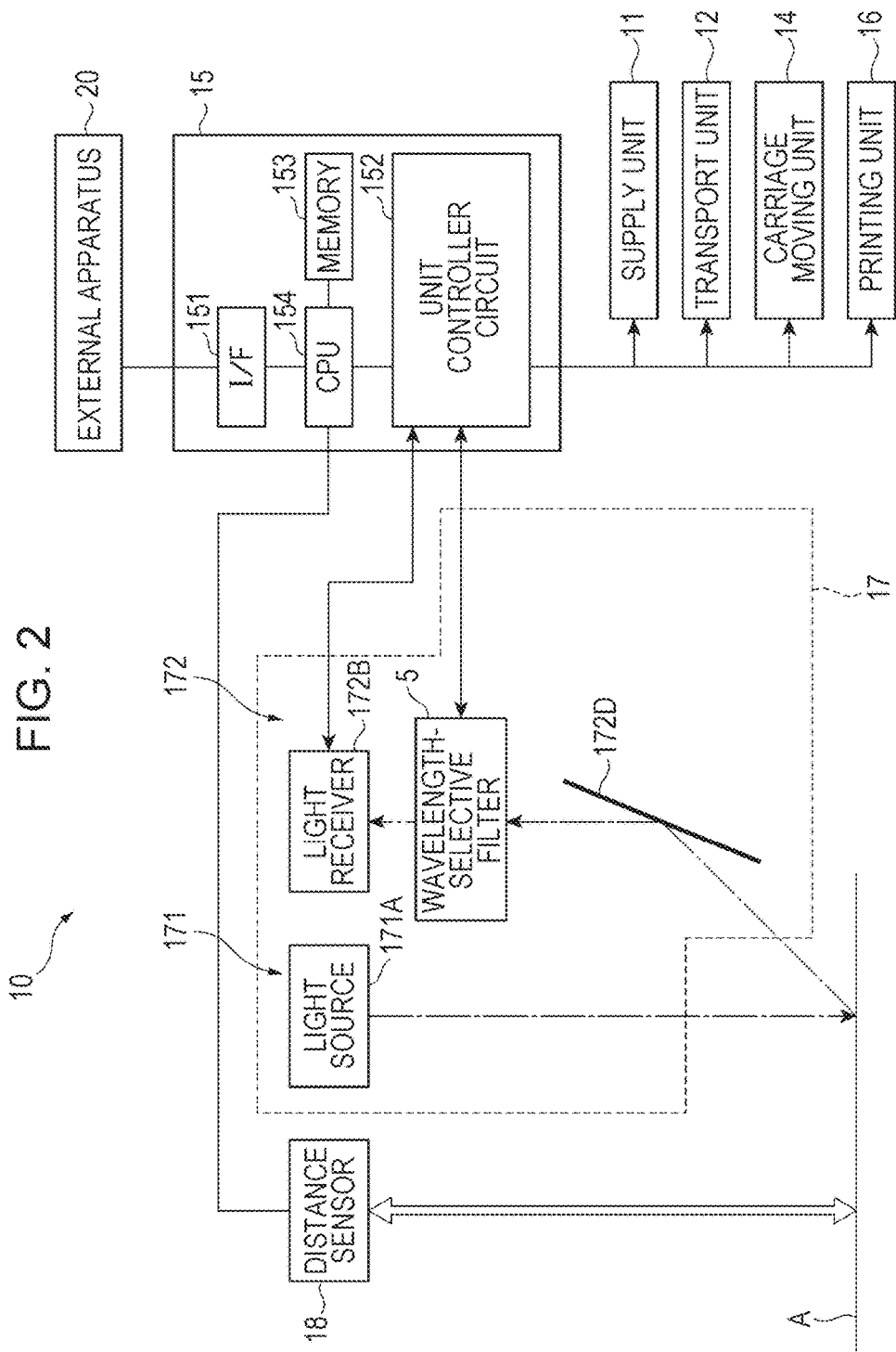
FIG. 2 is a block diagram illustrating a schematic configuration of the printer of the present embodiment.

FIG. 1 is a diagram illustrating an exterior configuration example of the printer 10 of the present embodiment. FIG. 2 is a block diagram illustrating a schematic configuration of the printer 10 of the present embodiment.

As illustrated in FIG. 1, the printer 10 includes a supply unit 11, a transport unit 12, a carriage 13, a carriage moving unit 14, and a control unit 15 (refer to FIG. 2). The printer 10 controls each of the units 11, 12, 14, and the carriage 13 based on print data that is input from an external apparatus 20 such as a personal computer and prints an image on a medium A. The medium A constitutes a measurement target and an image formation target of the present disclosure. In addition, the printer 10 of the present embodiment forms a measurement color patch at a predetermined position on the medium A based on preset calibration print data and performs spectrometry on the color patch. Accordingly, the printer 10 determines whether a color shift is present in the printed color by comparing an actual measured value from the color patch with the calibration print data and, if a color shift is present, corrects color based on the actual measured value.

Hereinafter, each configuration of the printer 10 will be specifically described.

The supply unit 11 is a unit that supplies the image formation target medium A (e.g., paper) to the position of image formation. The supply unit 11, for example, includes a roll body 111 (refer to FIG. 1) on which the medium A is wound, a roll drive motor (not illustrated), and a roll drive wheel array (not illustrated). The roll drive motor is rotationally driven based on a command from the control unit 15, and the torque of the roll drive motor is transmitted to the roll body 111 through the roll drive wheel array. Accordingly, the roll body 111 rotates and supplies the paper wound on the roll body 111 to the downstream side (+Y direction) in a Y direction (sub-scanning direction).

While the present embodiment illustrates supply of paper that is wound on the roll body 111, this illustration is not for limitation purposes. The medium A may be supplied in any method, such as supplying paper stacked in a tray one sheet at a time by a roller or the like.

The transport unit 12 transports the medium A supplied from the supply unit 11 along the Y direction. The transport unit 12 is configured to include a transport roller 121, a driven roller (not illustrated) that is arranged to interpose the medium A between the transport roller 121 and the driven roller and driven by the transport roller 121, and a platen 122.

Drive force is transmitted to the transport roller 121 from a transport motor (not illustrated). When the transport motor is driven by control of the control unit 15, the transport roller 121 is rotationally driven by the torque of the transport motor and transports, along the Y direction, the medium A that is interposed between the transport roller 121 and the driven roller. The platen 122 that faces the carriage 13 is disposed on the downstream side (+Y side) of the transport roller 121 in the Y direction.

The carriage 13 includes a printing unit 16 that prints an image on the medium A, a spectroscope 17 that performs spectrometry at a predetermined position of measurement (in a range of measurement) on the medium A, and a distance sensor 18 that measures the distance between the medium A and the spectroscope 17.

The carriage 13 is disposed to be movable by the carriage moving unit 14 along a main-scanning direction (X direction) that intersects with the Y direction.

The carriage 13 is connected to the control unit 15 by a flexible circuit 131 and performs a printing process (process of forming an image on the medium A) with the printing unit 16 and a light intensity measuring process with the spectroscope 17 based on a command from the control unit 15.

A detailed configuration of the carriage 13 will be described later.

The carriage moving unit 14 constitutes a moving unit of the present disclosure and causes the carriage 13 to reciprocate along the X direction based on a command from the control unit 15.

The carriage moving unit 14, for example, is configured to include a carriage guide shaft 141, a carriage motor 142, and a timing belt 143.

The carriage guide shaft 141 is arranged along the X direction and has both end portions fixed to, for example, the casing of the printer 10. The carriage motor 142 drives the timing belt 143. The timing belt 143 is approximately parallel to the carriage guide shaft 141, and a part of the carriage 13 is fixed thereto. When the carriage motor 142 is driven based on a command of the control unit 15, the timing belt 143 travels in normal (i.e., forward) and reverse directions, and the carriage 13 fixed to the timing belt 143 reciprocates while being guided by the carriage guide shaft 141.

Next, a configuration of the printing unit 16, the spectroscope 17, and the distance sensor 18 disposed in the carriage 13 will be described.

Configuration of Printing Unit (Image Forming Unit)

The printing unit 16 is an image forming unit of the present disclosure and forms an image on the medium A by discharging ink separately onto the medium A from the part facing the medium A.

Ink cartridges 161 that correspond to ink of a plurality of colors are mounted on the printing unit 16 in an attachable and detachable manner, and ink is supplied from each ink cartridge 161 to an ink tank (not illustrated) through a tube (not illustrated). In addition, nozzles (not illustrated) that discharge ink drops are disposed on the lower face of the printing unit 16 (i.e., a position facing the medium A) in correspondence with each color. A piezoelectric element, for example, is arranged in each of these nozzles. Driving the piezoelectric element causes an ink drop supplied from the ink tank to be discharged and hit the medium A, and a dot is formed.

Configuration of Spectroscope

Figure 3:
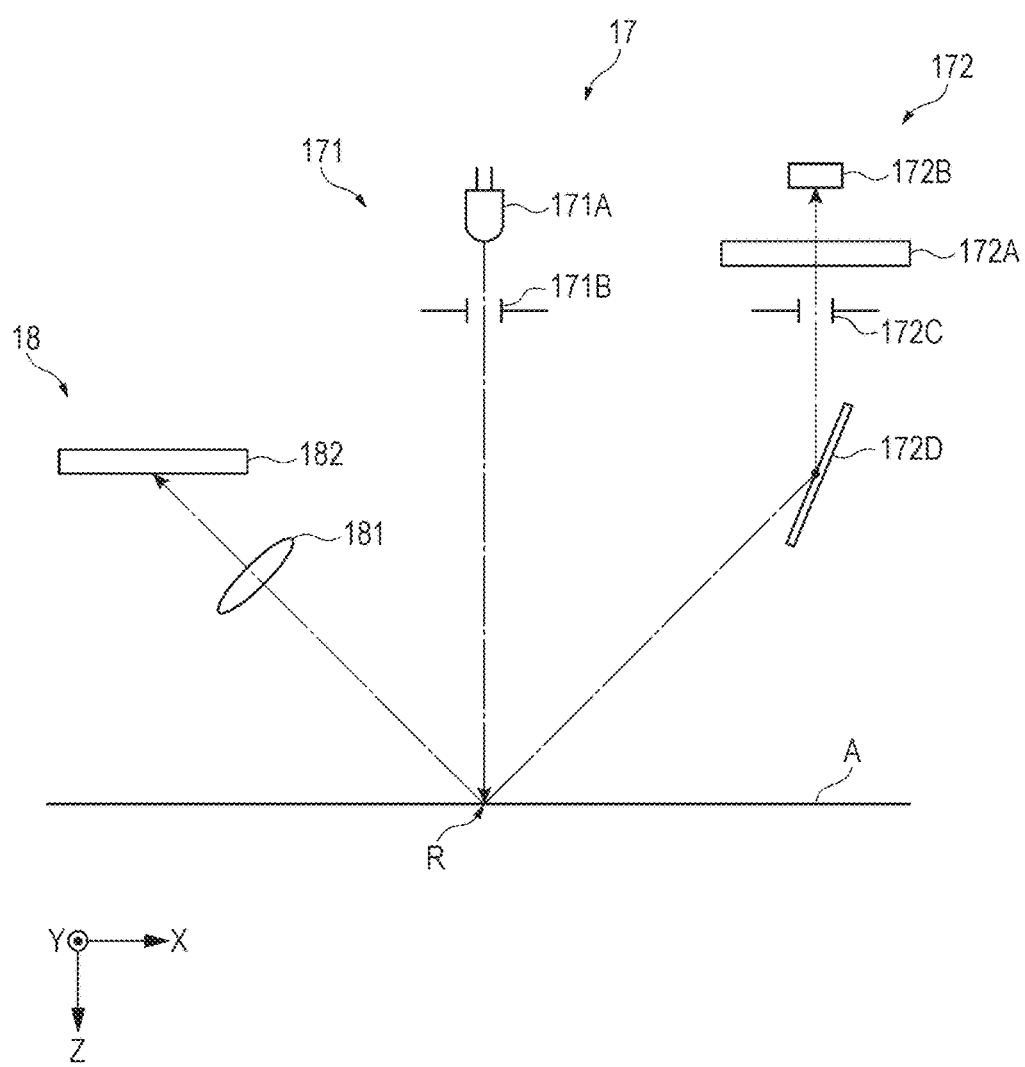
FIG. 3 is a schematic diagram illustrating a configuration of a spectroscope and a distance sensor of the present embodiment.

FIG. 3 is a schematic diagram illustrating a configuration of the spectroscope 17.

The spectroscope 17 includes an illumination optical system 171 and a light receiving optical system 172 as illustrated in FIG. 3.

The spectroscope 17 irradiates the medium A with light (i.e., illumination light) from the illumination optical system 171 and receives reflective light reflected by the medium A with the light receiving optical system 172. A spectroscopy device 172A that is disposed in the light receiving optical system 172 can select a wavelength to be transmitted based on control of the control unit 15 and can perform spectrometry at a position of measurement R on the medium A by measuring the intensity of light of each wavelength in visible light.

In the present embodiment, spectrometry is performed in accordance with geometrical optics condition (0°: 45°x) defined by the color measurement standard (JIS Z 8722). In the present embodiment, light from the illumination optical system 171 is incident on the medium A in the direction of the normal line toward the medium A or may also be incident at an angle of 10° or less. Light reflected by the medium A at 45°±2° is received by the light receiving optical system 172.

While the present embodiment illustrates the illumination optical system 171 and the light receiving optical system 172 as being linearly configured along the X direction for convenience of description, this illustration is not for limitation purposes. The illumination optical system 171 and the light receiving optical system 172 may be linearly configured along the Y direction, or the illumination optical system 171 and the light receiving optical system 172 may be linearly configured along the direction intersecting with the X and Y directions.

Configuration of Illumination Optical System

The illumination optical system 171 includes a light source 171A and an illumination-side aperture 171B as illustrated in FIG. 3. A collimating lens, for example, that turns light from the light source 171A into parallel light may be separately disposed.

In the illumination optical system 171, the medium A is irradiated with light, of the light emitted from the light source 171A, that passes through the illumination-side aperture 171B. Such illumination light has a high intensity (high luminance) in the central portion (near the principal ray) thereof and has a low intensity in the peripheral portion thereof. The illumination light turns into a spotlight by passing through the illumination-side aperture 171B.

Configuration of Light Receiving Optical System

The light receiving optical system 172 includes the spectroscopy device 172A, a light receiver 172B, a light-reception-side aperture 172C, and a reflecting mirror 172D as illustrated in FIG. 3.

In the light receiving optical system 172, light that is reflected by the medium A is reflected by the reflecting mirror 172D toward the spectroscopy device 172A, and the light receiver 172B receives light of a predetermined wavelength on which spectroscopy is performed by the spectroscopy device 172A. The light receiving optical system 172 may be configured as a bandpass filter that cuts light other than visible light.

The light-reception-side aperture 172C may be disposed in plural quantities. The position at which the light-reception-side apertures 172C are disposed may be at the front of the light receiver 172B or, for example, may be incorporated into the spectroscopy device 172A. While the present embodiment illustrates a configuration in which reflective light is reflected by the reflecting mirror 172D toward the light receiver 172B, light that is incident on the light receiving optical system 172 may be directly incident on the spectroscopy device 172A without disposing the reflecting mirror 172D.

Configuration of Spectroscopy Device

Figure 4:
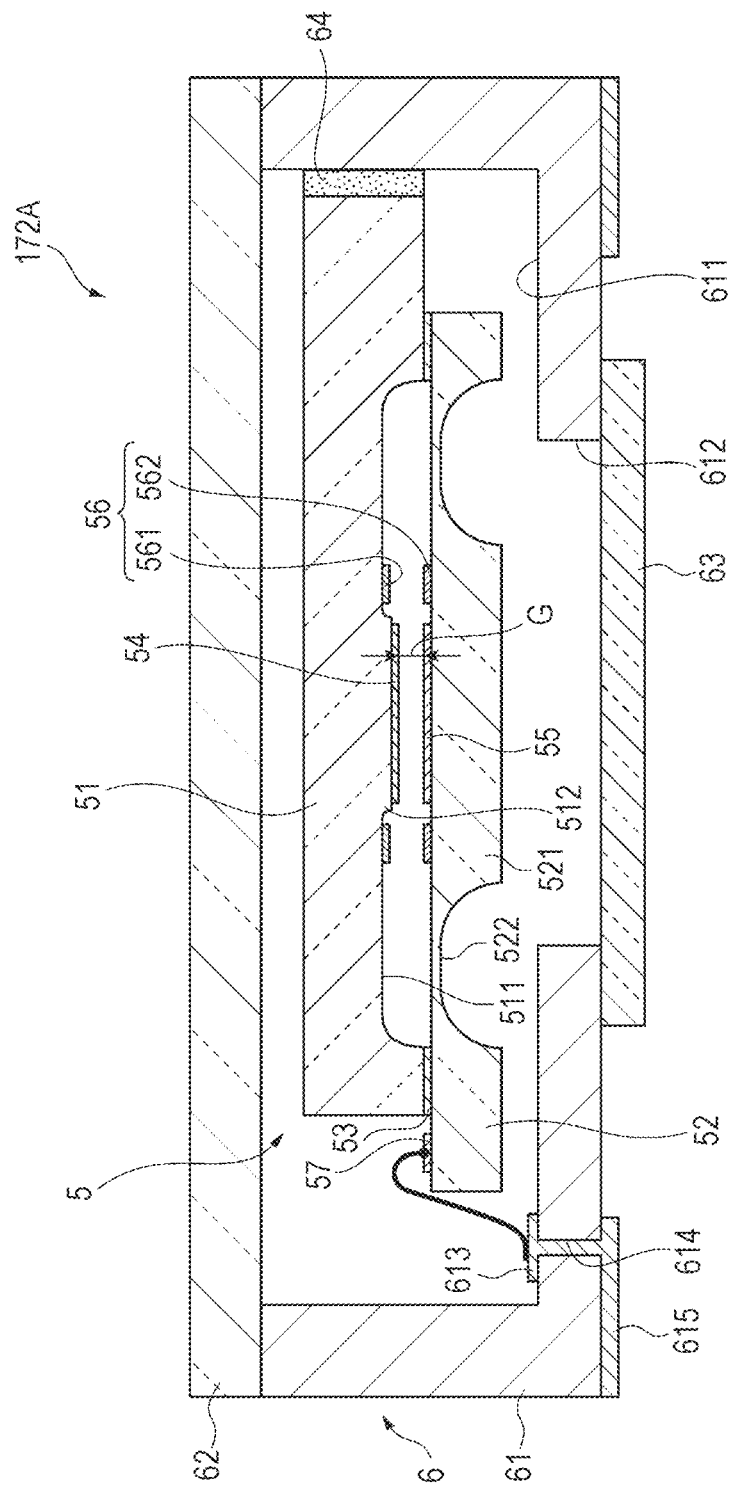
FIG. 4 is a sectional view illustrating a spectroscopy device that includes a wavelength-selective interference filter (spectroscopy element) of the present embodiment.

FIG. 4 is a sectional view illustrating a schematic configuration of the spectroscopy device 172A.

The spectroscopy device 172A includes a casing 6 and a wavelength-selective interference filter 5 (i.e., spectroscopy element) that is accommodated in the casing 6.

Configuration of Wavelength-Selective Interference Filter

The wavelength-selective interference filter 5 is a wavelength-selective Fabry-Pérot etalon element and constitutes a spectroscopy element of the present disclosure. While the present embodiment illustrates the wavelength-selective interference filter 5 as being arranged in the spectroscope 17 while being accommodated in the casing 6, the wavelength-selective interference filter 5, for example, may be configured to be directly arranged in the spectroscope 17.

The wavelength-selective interference filter 5 includes a light-transmissive fixed substrate 51 and a light-transmissive movable substrate 52 as illustrated in FIG. 4. The fixed substrate 51 and the movable substrate 52 are integrally configured by bonding with a bonding film 53. The fixed substrate 51 includes a first groove portion 511 formed by etching and a second groove portion 512 having a smaller depth than the first groove portion 511. A fixed electrode 561 and a fixed reflecting film 54 are respectively disposed in the first groove portion 511 and in the second groove portion 512. The fixed reflecting film 54 is configured of, for example, a metal film made of Ag, an alloy film made of an Ag alloy, a dielectric multilayer film made of a laminate of a high-refractive layer and a low-refractive layer, or a laminated body made of a laminate of a metal film (alloy film) and a dielectric multilayer film.

The movable substrate 52 includes a movable portion 521 and a holding portion 522 that is disposed outside of the movable portion 521 to hold the movable portion 521. A face of the movable portion 521 that faces the fixed substrate 51 includes a movable electrode 562 which faces the fixed electrode 561 and a movable reflecting film 55 which faces the fixed reflecting film 54. As the movable reflecting film 55, a reflecting film having the same configuration as the fixed reflecting film 54 can be used. The holding portion 522 is a diaphragm that surrounds the movable portion 521 and is formed to have a smaller thickness dimension than the movable portion 521.

The fixed electrode 561 and the movable electrode 562 constitute an electrostatic actuator 56 in the wavelength-selective interference filter 5. Applying a voltage to the electrostatic actuator 56 can change the dimension of a gap G between the fixed reflecting film 54 and the movable reflecting film 55. In a peripheral portion of the movable substrate 52 that does not face the fixed substrate 51, the movable substrate 52 includes a plurality of electrode pads 57 that is individually connected to the fixed electrode 561 and to the movable electrode 562.

Configuration of Casing

The casing 6 includes a base 61 and a glass substrate 62 as illustrated in FIG. 4. The base 61 and the glass substrate 62 are bonded by, for example, low melting point glass bonding and form an accommodative space therein. The wavelength-selective interference filter 5 is accommodated in the accommodative space.

The base 61 is configured of, for example, a laminate of thin ceramic plates and includes a recessed portion 611 that can accommodate the wavelength-selective interference filter 5. The wavelength-selective interference filter 5 is fixed to, for example, a side face of the recessed portion 611 of the base 61 by a fixing material 64. A light pass hole 612 is disposed on the bottom face of the recessed portion 611 of the base 61, and a cover glass 63 is bonded to the bottom face cover the light pass hole 612.

An inside terminal unit 613 is disposed in the base 61 and is connected to the electrode pad 57 of the wavelength-selective interference filter 5. The inside terminal unit 613 is connected through a conductive hole 614 to an outside terminal unit 615 that is disposed outside of the base 61. The outside terminal unit 615 is electrically connected to the control unit 15.

Configuration of Light Receiver

Returning to FIG. 3, the light receiver 172B is arranged on the optical axis of the wavelength-selective interference filter 5 (straight line passing through the central points of the reflecting films 54 and 55). The light receiver 172B receives, in a light receiving region, light that is transmitted through the wavelength-selective interference filter 5, and outputs a detection signal (current value) that corresponds to the intensity of light received. The detection signal output by the light receiver 172B is input into the control unit 15 through an I-V converter (not illustrated), an amplifier (not illustrated), and an AD converter (not illustrated).

Configuration of Distance Sensor

The distance sensor 18 is a distance measurer of the present disclosure and is disposed in the carriage 13 along with the printing unit 16 and the spectroscope 17.

As illustrated in FIG. 3, the distance sensor 18 includes a light receiving lens 181 and a position sensing device (PSD) 182. Light that is incident from the position of measurement R is received by the PSD 182 through the light receiving lens 181.

While the present embodiment uses a PSD type distance sensor that detects the central position in the received light and calculates the distance between the medium A and the spectroscope 17 by triangulation based on the central position, this is not for limitation purposes. For example, a distance sensor 18 of a CMOS type that uses a complementary metal oxide semiconductor (CMOS) may be used. In addition, the distance sensor 18 is not limited to a sensor that calculates distance by triangulation using light from the light source 171A. A distance sensor using other distance measuring methods may also be used. For example, a distance sensor that divides laser light into reference light and measured light and calculates distance based on an interference fringe of multiplexed light in which measured light reflected by the medium A and the reference light are multiplexed may also be used.

Figure 5A:
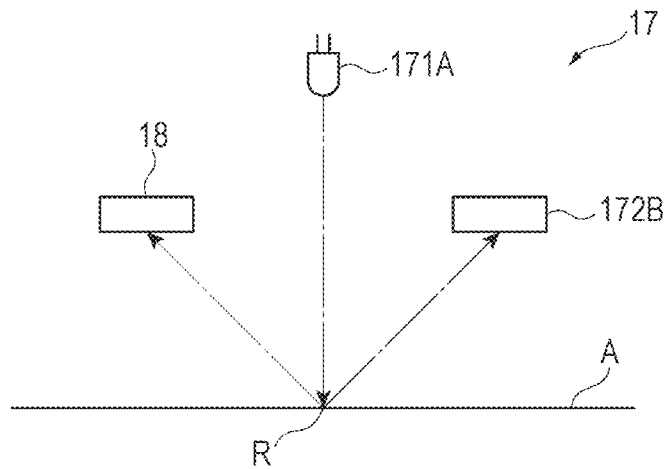
FIGS. 5A to 5C are diagrams illustrating a position of measurement of distance performed by the distance sensor and a position of measurement performed by the spectroscope of the present embodiment.
Figure 5B:
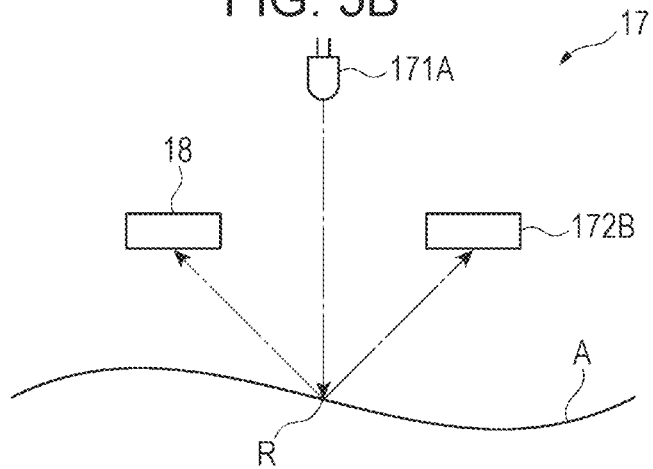
Figure 5C:
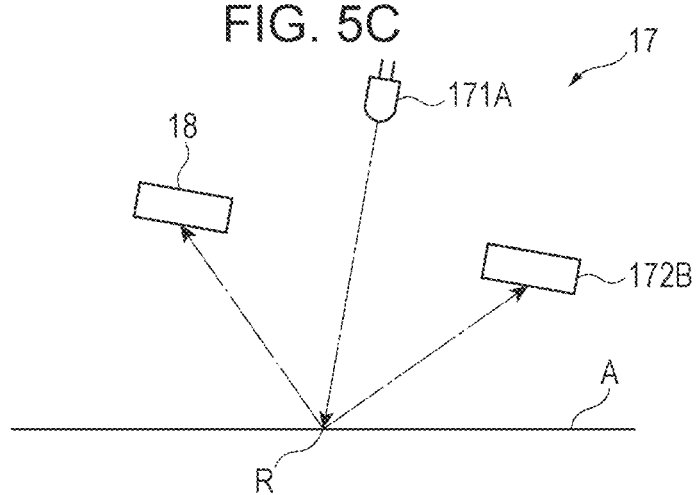
Figure 6A:
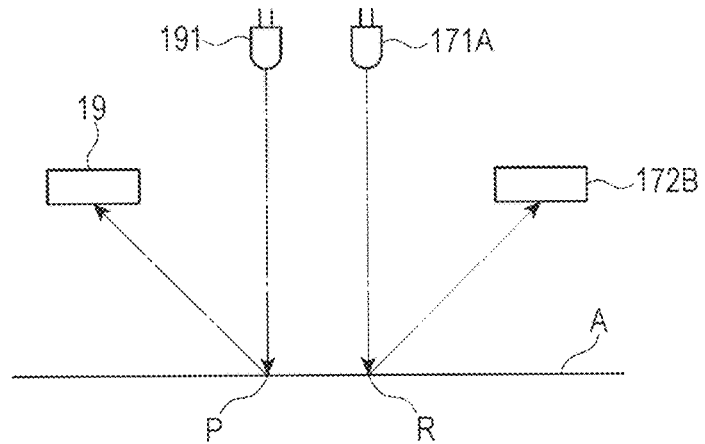
FIGS. 6A to 6C are diagrams illustrating a position of measurement of distance performed by a distance sensor and a position of measurement performed by a spectroscope of a comparative example.
Figure 6B:
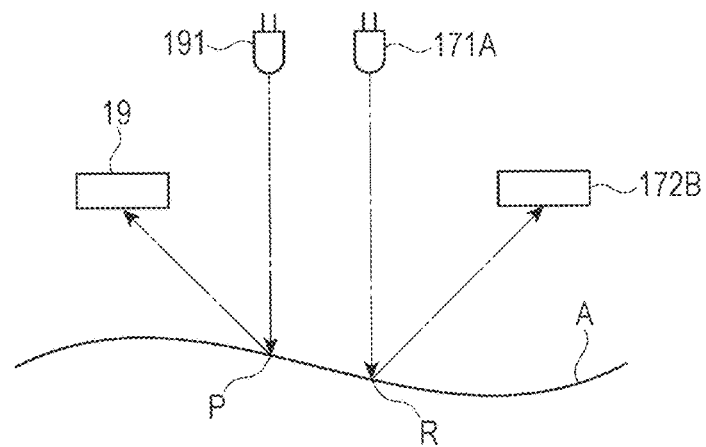
Figure 6C:
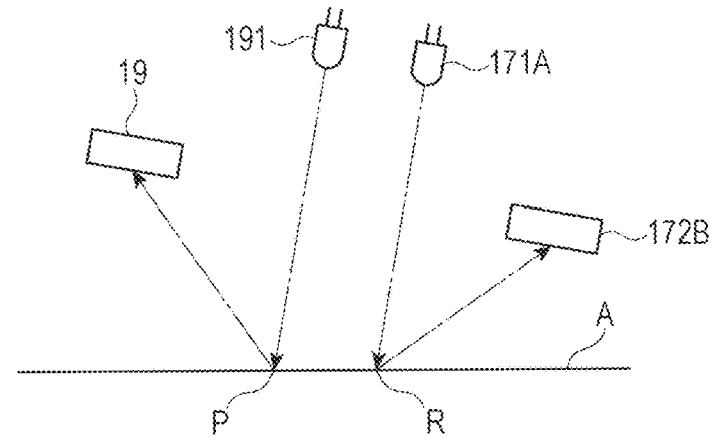

FIGS. 5A to 5C are diagrams illustrating a position of measurement of distance performed by the distance sensor 18 and a position of measurement performed by the spectroscope in the present embodiment. FIGS. 6A to 6C are diagrams illustrating a position of measurement of distance performed by a distance sensor and a position of measurement performed by a spectroscope in a comparative example.

As illustrated in FIG. 6A, a distance sensor 19 and a light sensor 191 are located separately from the spectroscope 17, which includes the light source 171A and the light receiver 172B. The distance sensor 19 is positioned to measure the distance between the medium A and the spectroscope 17 at a position other than the position of measurement R. In this case, the position of measurement R at which spectrometry is performed is different from a position of measurement P at which the distance is measured by the distance sensor 19. Therefore, as illustrated in FIG. 6B, if the distance between the medium A and the spectroscope 17 is partially different because of a ripple or the like occurring on the medium A, the distance between the position of measurement R and the spectroscope 17 cannot be measured. In the example of FIG. 6B, the distance measured by the distance sensor 19 is shorter than the original measured distance between the position of measurement R and the spectroscope 17.

In addition, as illustrated in FIG. 6C, if the carriage 13 is slanted by, for example, vibration during movement of the carriage 13, the distance between the position of measurement R and the spectroscope 17 cannot be measured. In the example illustrated in FIG. 6C, the distance measured by the distance sensor 19 is longer than the original measured distance between the position of measurement R and the spectroscope 17.

The distance sensor 18 of the present embodiment is incorporated into the spectroscope 17 as illustrated in FIG. 3 and FIGS. 5A to 5C, and the distance between the position of measurement R and the spectroscope 17 is detected by irradiating the position of measurement R with light from the light source 171A and receiving reflective light reflected at the position of measurement R. That is, in the present embodiment, the illumination light of the light source 171A is used in both spectrometry and distance measurement. In this case, even if a ripple, for example, occurs on the medium A as illustrated in FIG. 5B, the distance between the medium A and the spectroscope 17 is measured at the position of measurement R where spectrometry is performed by the spectroscope 17. In addition, even if the carriage 13 is slanted during movement or the like of the carriage 13 as illustrated in FIG. 5C, the distance between the medium A and the spectroscope 17 is measured at the position of measurement R where spectrometry is performed.

Configuration of Control Unit

With reference to FIG. 2, the control unit 15 is configured to include an I/F 151, a unit controller circuit 152, a memory 153, and a central processing unit (CPU) 154.

The I/F 151 inputs to the CPU 154 the print data that is provided from the external apparatus 20.

The unit controller circuit 152 includes a controller circuit that controls each of the supply unit 11, the transport unit 12, the printing unit 16, the light source 171A, the wavelength-selective interference filter 5, the light receiver 172B, and the carriage moving unit 14 and controls operation of each unit based on a command signal from the CPU 154. It is also possible that a controller circuit of each unit is disposed separately from the control unit 15 and is connected to the control unit 15.

The memory 153 stores various programs and various data that control operation of the printer 10.

For example, the memory 153 may store: V-λ data that represents the wavelength of light transmitted through the wavelength-selective interference filter 5 with respect to the voltage applied to the electrostatic actuator 56 when the wavelength-selective interference filter 5 is controlled; and printing profile data that stores the amount of each ink to be discharged with respect to color data which is included as the print data. In addition, the memory 153 may store light emitting characteristics of the light source 171A with respect to each wavelength, light receiving characteristics (light reception sensitivity characteristics) of the light receiver 172B with respect to each wavelength, and the like.

Furthermore, the memory 153 stores distance-intensity data. The distance-intensity data is data that indicates a relationship of a light intensity at the position of measurement R with respect to the distance between the medium A and the spectroscope 17.

Figure 7:
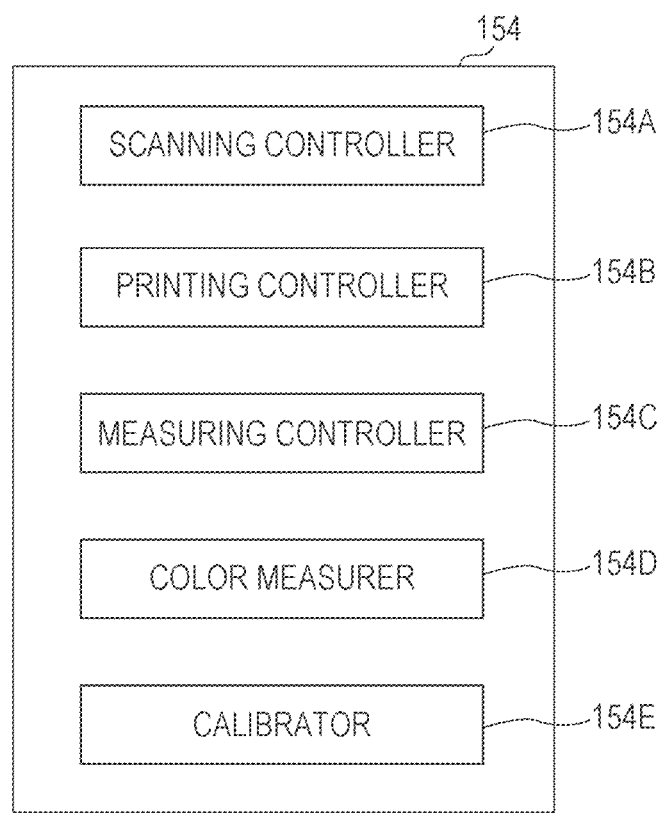
FIG. 7 is a block diagram illustrating each functional configuration of a control unit of the printer in the first embodiment.

FIG. 7 is a block diagram illustrating a functional configuration of the CPU 154 included in the control unit 15 of the printer 10.

The CPU 154 functions as a scanning controller 154A, a printing controller 154B, a measuring controller 154C, a color measurer 154D, and a calibrator 154E as illustrated in FIG. 7 by reading and executing various programs stored in the memory 153.

The scanning controller 154A outputs to the unit controller circuit 152 a command signal that indicates driving of the supply unit 11, the transport unit 12, and the carriage moving unit 14. Accordingly, the unit controller circuit 152 drives the roll drive motor of the supply unit 11 and supplies the medium A to the transport unit 12. The unit controller circuit 152 drives the transport motor of the transport unit 12 to transport a predetermined region of the medium A along the Y direction to a position on the platen 122 facing the carriage 13. The unit controller circuit 152 drives the carriage motor 142 of the carriage moving unit 14 to move the carriage 13 along the X direction.

The printing controller 154B outputs a command signal that indicates control of the printing unit 16 to the unit controller circuit 152 based on, for example, the print data that is input from the external apparatus 20. When the command signal is output to the unit controller circuit 152 from the printing controller 154B, the unit controller circuit 152 outputs a printing control signal to the printing unit 16 to drive the piezoelectric element disposed in the nozzle and causes ink to be discharged to the medium A. When printing is performed, an image configured of a plurality of dots is printed on the medium A by alternately repeating a dot forming operation that moves the carriage 13 along the X direction and discharges ink from the printing unit 16, as the carriage 13 is moving, to form a dot and a transport operation that transports the medium A in the Y direction.

The measuring controller 154C constitutes a spectrometry unit of the present disclosure along with the color measurer 154D and performs a spectrometry process. Specifically, the measuring controller 154C outputs a command signal for controlling the light source 171A to the unit controller circuit 152 and causes light to be emitted from the light source 171A.

The measuring controller 154C reads a drive voltage for the electrostatic actuator 56 with respect to the wavelength of light transmitted through the wavelength-selective interference filter 5 from the V-λ data of the memory 153 and outputs a command signal to the unit controller circuit 152. Accordingly, the unit controller circuit 152 applies the drive voltage from the command signal to the wavelength-selective interference filter 5, and light of a desired transmitted wavelength is transmitted through the wavelength-selective interference filter 5.

The measuring controller 154C stores the detection signal in association with the voltage applied to the electrostatic actuator 56 (or the wavelength of light transmitted through the wavelength-selective interference filter 5 that corresponds to the voltage) in the memory 153.

The color measurer 154D constitutes the spectrometry unit of the present disclosure along with the measuring controller 154C. The color measurer 154D corrects the intensity of received light of a plurality of wavelengths obtained by the spectrometry process based on the distance measured by the distance sensor 18, and measures the intensity of color at the position of measurement R based on the corrected intensity of received light.

The calibrator 154E corrects (updates) the printing profile data based on a color measurement result from the color measurer 154D.

Operation of each functional configuration in the control unit 15 will be described in detail later.

Spectroscopy Method

Next, a spectroscopy method performed by the printer 10 of the present embodiment will be described based on the drawings.

FIG. 8 is a flowchart illustrating the spectroscopy method in the printer 10.

As a spectrometry process performed by the printer 10, an example in which the spectrometry process is performed on a plurality of color patches printed by the printing unit 16 will be described.

In the spectrometry process of the present example, a command that indicates performing of the spectrometry process is received from, for example, user operation or input from the external apparatus 20 (Step S1). When the command is received in Step S1, the scanning controller 154A controls the transport unit 12 and the carriage moving unit 14 to transport the medium A along the Y direction so that the carriage 13 is positioned on a line in which the color patches are arranged and, furthermore, to move the carriage 13 to the position of calibration (for example, to the −X side end portion) (Step S2).

The position of calibration is a position for performing a calibration data obtaining process, described later, and is a white region in the medium A (e.g., white paper) where no color patch is disposed. The calibration reference object is not limited to the white region. For example, a calibration reference object that has a known reflectance in each wavelength may be separately installed. For example, a white reference object having a known reflectance may be disposed at a part of the platen 122, and the white reference object may be used as the calibration reference object of the present disclosure.

The control unit 15 performs the calibration data obtaining process that obtains calibration data to correct a spectrometry result. In the calibration data obtaining process, the measuring controller 154C performs the spectrometry process at the position of calibration and measures the intensity of light (i.e., an output value from the light receiver 172B), as a measured value. The intensity of light may be measured for, for example, n measured wavelength bands (e.g., 16 bands) in the visible light region from 400 nm to 700 nm at an interval of 20 nm.

Specifically, the measuring controller 154C first turns on the light source 171A (Step S3).

The measuring controller 154C applies the drive voltage to the electrostatic actuator 56 of the wavelength-selective interference filter 5 based on the V-λ data stored in the memory 153. Accordingly, light, of the reflective light that is reflected from the position of measurement R to the spectroscope 17, having a measured wavelength corresponding to the dimension of the gap between the reflecting films 54 and 55 of the wavelength-selective interference filter 5 is transmitted and is received by the light receiver 172B, and the intensity of light received in the measured wavelength is measured (Step S4: spectrometry step).

The measuring controller 154C obtains the distance between the medium A and the spectroscope 17 measured by the distance sensor 18 in synchronization with Step S4 (Step S5: distance measuring step).

The measuring controller 154C stores the intensity of received light measured in Step S4 (reference light intensity) and the distance obtained in Step S5 in association with the measured wavelength (or the voltage applied to the electrostatic actuator 56) in the memory 153.

The measuring controller 154C determines whether there is an unmeasured wavelength (Step S6). That is, the measuring controller 154C determines whether the reference light intensity is measured in 16 measured wavelength bands from 400 nm to 700 nm at an interval of 20 nm. If Step S6 is determined as "Yes" (if there is an unmeasured wavelength), the process returns to Step S4, and measurement of the reference light intensity continues in the unmeasured wavelength.

If Step S6 is determined as "No", the scanning controller 154A controls the transport unit 12 and the carriage moving unit 14 to move the carriage 13 so that the position of measurement R is positioned on the color patches (Step S7).

The measuring controller 154C performs the spectrometry process on the color patches by performing the same process as in Step S4. That is, the measuring controller 154C applies the drive voltage to the electrostatic actuator 56 of the wavelength-selective interference filter 5 based on the V-λ data stored in the memory 153 and measures the intensity of received light based on a light reception signal from the light receiver 172B (Step S8: spectrometry step).

The measuring controller 154C obtains the distance between the medium A and the spectroscope 17 measured by the distance sensor 18 in synchronization with the timing of obtaining the intensity of received light in Step S8 (Step S9: distance measuring step).

The measuring controller 154C stores the intensity of received light measured in Step S8 (measured light intensity) and the distance obtained in Step S9 in association with the measured wavelength (or the voltage applied to the electrostatic actuator 56) in the memory 153.

The measuring controller 154C determines whether there is an unmeasured wavelength (Step S10) as in Step S6, and the process returns to Step S8 if Step S10 is determined as "Yes".

If Step S10 is determined as "No", the measuring controller 154C further determines whether there is an unmeasured color patch (Step S11).

If Step S11 is determined as "Yes", the process returns to Step S7, and the scanning controller 154A controls the transport unit 12 and the carriage moving unit 14 to move the position of measurement R in the spectroscope 17 to a subsequent color patch and continues the spectrometry process on the subsequent color patch.

If Step S11 is determined as "No", the measuring controller 154C turns off the light source 171A (Step S12).

The color measurer 154D corrects the reference light intensity measured in Step S4 and the measured light intensity measured in Step S8 based on the distance-intensity data stored in the memory 153 (Step S13: correcting step).

Hereinafter, light intensity correction performed by the color measurer 154D will be described.

Figure 9A:
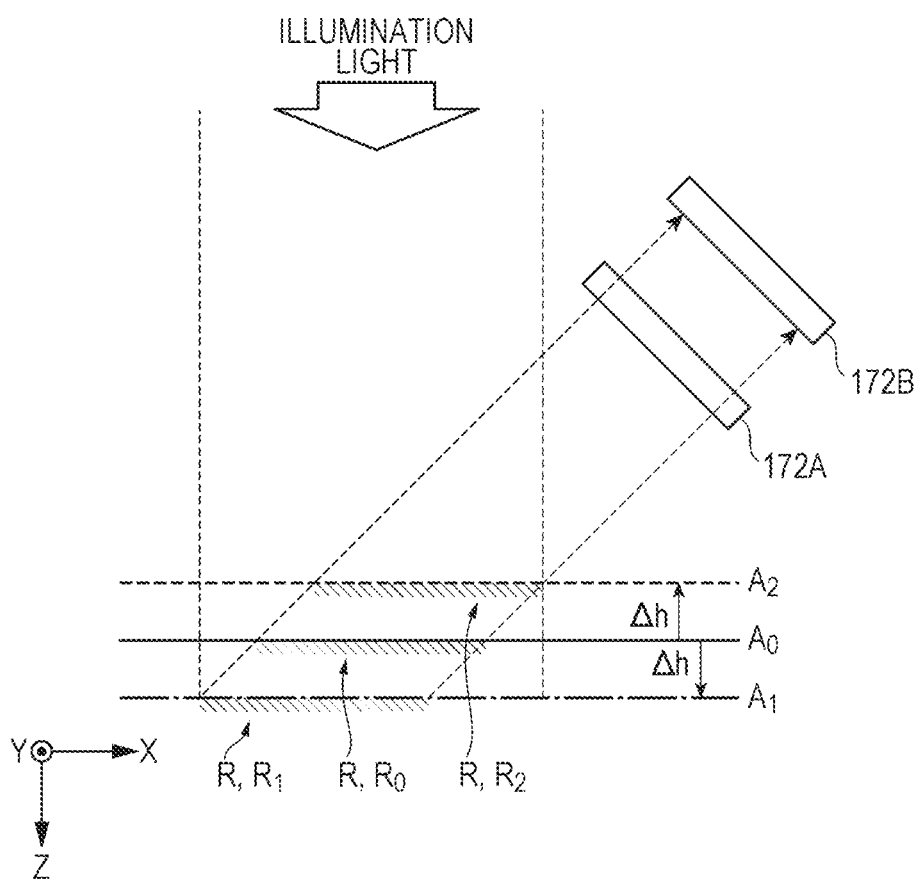
FIGS. 9A and 9B are diagrams illustrating a relationship between a position of illumination light irradiation and the position of measurement in the first embodiment.
Figure 9B:
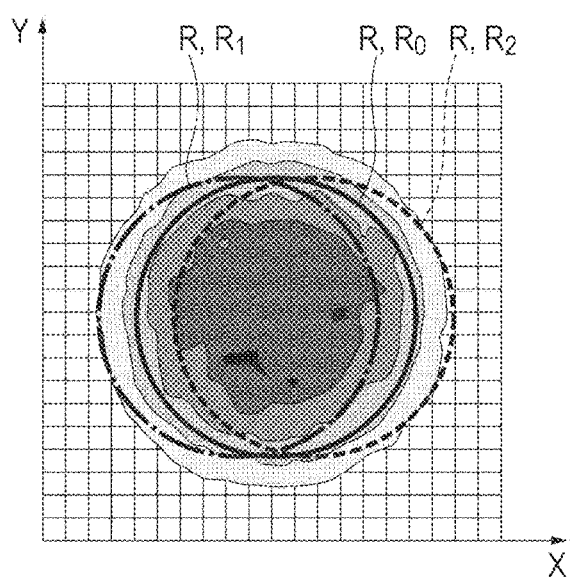

FIGS. 9A and 9B are diagrams illustrating a relationship between the position of illumination light irradiation and the position of measurement in the present embodiment. FIG. 9A illustrates a relationship between the position of irradiation irradiated with the illumination light and the position of measurement R at which the illumination light is received by the light receiver 172B of the spectroscope 17 when the position of the medium A is displaced in the Z direction. In other words, FIG. 9A illustrates a range of irradiation of the illumination light and the position of measurement R at which the illumination light is reflected and received by the light receiver 172B when the distance between the medium A and the spectroscope 17 changes. FIG. 9B is a diagram illustrating a light distribution at the position of measurement R when the position of the medium A is displaced in the Z direction.

As illustrated in FIGS. 9A and 9B, if the distance between the medium A and the spectroscope 17 is equal to a reference distance without a ripple or the like on the medium A (i.e., a reference position $A_0$), the position of measurement R, which is indicated by $R_0$ in FIGS. 9A and 9B, is the central portion of the spotlight. In other words, the position of measurement $R_0$, from which light is received by the light receiver 172B of the spectroscope 17, aligns with the central position of the spotlight irradiated by the illumination light when the medium A does not have any ripples. In this case, as illustrated by a light distribution in FIG. 9B, a large area of a high illuminance region is included in a position of measurement $R_0$, and the intensity of light received in the light receiver 172B is also increased.

As illustrated in FIGS. 9A and 9B, when the medium A is positioned at a position $A_1$, the distance between the medium A and the spectroscope 17 is increased by Δh and the position of measurement R is moved to the −X side (i.e., position $R_1$). In this case, a high illuminance region is present on the +X side of the position of measurement $R_1$ while a low illuminance region is present on the −X side thereof. Therefore, the intensity of received light is further decreased in a case where reflected light from the position of measurement $R_1$ is received by the light receiver 172B than in a case where reflected light from the position of measurement $R_0$ is received.

Similarly, when the medium A is positioned at a position $A_2$, the distance between the medium A and the spectroscope 17 is decreased by Δh and the position of measurement R is moved to the +X side (i.e., position $R_2$) as illustrated in FIGS. 9A and 9B. Therefore, the intensity of received light reflected is further decreased from the position of measurement $R_2$ than from the position of measurement $R_0$.

In the present embodiment, the distance-intensity data that indicates a change in the intensity of light received by the light receiver 172B with respect to the distance between the medium A and the spectroscope 17 is stored in the memory 153 as described above.

Figure 10:
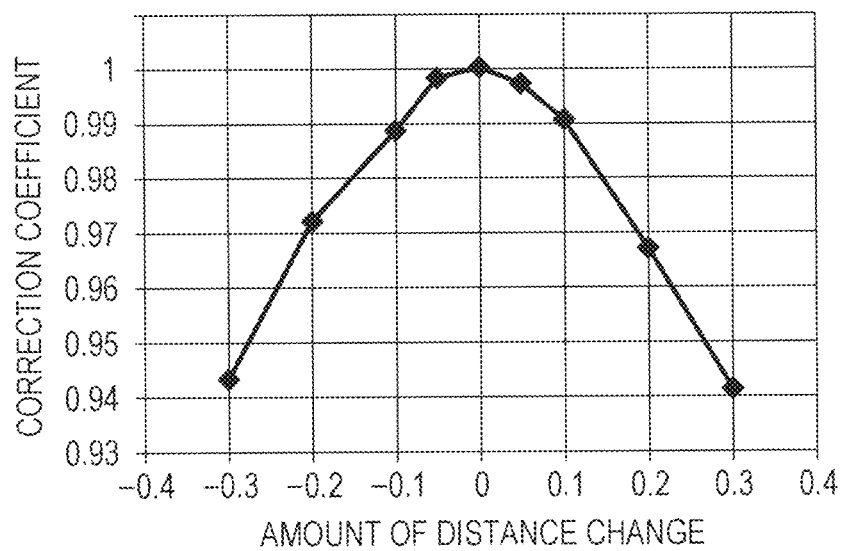
FIG. 10 is a diagram illustrating an example of distance-intensity data in the first embodiment.

FIG. 10 is a diagram illustrating an example of the distance-intensity data of the present embodiment.

Specifically, as illustrated in FIG. 10, the ratio of change in the intensity of light received by the light receiver 172B (i.e., a correction coefficient) to an amount of distance change Δh between the medium A and the spectroscope 17 (i.e., amount of change of the medium A in the Z direction from the reference position $A_0$) is recorded in the distance-intensity data. The distance-intensity data is set for each measured wavelength. For example, since spectrometry is performed in 16 measured wavelength bands in the visible light region (400 nm to 700 nm) in the present embodiment, the distance-intensity data is stored in the memory 153 for each of the 16 measured wavelength bands.

While FIG. 10 illustrates the distance-intensity data in which the correction coefficient is recorded with respect to the amount of distance change, the correction coefficient may be recorded with respect to the distance between the medium A and the spectroscope 17.

In Step S13, the color measurer 154D obtains the correction coefficient (ratio of change in light intensity) corresponding to the distance obtained in Step S5 from the distance-intensity data, and calculates a corrected reference light intensity by dividing the reference light intensity measured in Step S4 by the correction coefficient. Similarly, the color measurer 154D obtains the correction coefficient corresponding to the distance obtained in Step S8 from the distance-intensity data and calculates a corrected measured light intensity by dividing the measured light intensity measured in Step S9 by the correction coefficient.

The color measurer 154D calculates a reflectance $R_2$ from $R_\lambda = E_\lambda / E_{\lambda 0}$ based on the corrected reference light intensity ($E_{\lambda 0}$) and the corrected measured light intensity ($E_\lambda$) in each measured wavelength (Step S14).

In addition, the color measurer 154D calculates the intensity of color (for example, an XYZ value or an L*a*b* value) from the reflectance $R_\lambda$ in each measured wavelength and stores the intensity of color in the memory 153.

The color measurer 154D may output a calculated spectral reflectance or the intensity of color to, for example, the external apparatus 20 or to a display disposed with the printer 10 or may control the printing unit 16 to print the color measurement result.

The calibrator 154E updates the printing profile data stored in the memory 153 based on the color measurement result for each color patch.

Effect of Present Embodiment

In the printer 10 of the present embodiment, the spectroscope 17 and the distance sensor 18 are mounted on the carriage 13. In addition, the color measurer 154D corrects the intensity of light received in each wavelength obtained from spectrometry using the spectroscope 17 by using the distance between the medium A and the spectroscope 17 measured by the distance sensor 18. Accordingly, even if the distance between the position of measurement and the spectroscope is changed, the intensity of received light can be corrected according to the distance. Thus, a high accuracy colorimetry process can be performed on the measurement target color patch based on the intensity of received light.

In the present embodiment, the distance sensor 18 measures the distance between the medium A and the spectroscope 17 by using the illumination light from the light source 171A of the spectroscope 17. Thus, distance can be accurately measured at the position of measurement R.

That is, if the position of measurement R for spectrometry is different from the position of distance measurement performed by the distance sensor 18, the distance between the medium A and the spectroscope 17 may be different at the position of measurement R and at the position of distance measurement because of a ripple occurring at a part of the medium A. In such a case, distance cannot be accurately measured at the position of measurement R, and thus, the intensity of received light cannot be appropriately corrected.

Regarding this matter, distance is measured by the distance sensor 18 at the position of measurement R in the present embodiment. Thus, the intensity of received light can be accurately corrected based on the distance.

In addition, since there is no need to dispose a separate distance sensor light source, a configuration can be simplified and reduced in size.

In the present embodiment, distance is measured by the distance sensor 18 at the timing of performing spectrometry (i.e., at the time of measuring the intensity of received light, which is the measured value), and the intensity of received light is corrected based on the measured distance. That is, the spectrometry process is performed in synchronization with distance measurement performed by the distance sensor 18.

Accordingly, if the distance between the medium A and the spectroscope 17 is changed according to the position of measurement R by performing spectrometry while the carriage 13 is moved at a constant speed in the X direction, the distance between the medium A and the spectroscope 17 can be measured at each position of measurement R. Accordingly, the measured value (intensity of received light) at the position of measurement R can be corrected based on accurate distance, and spectrometry accuracy and colorimetry accuracy can be improved.

In the present embodiment, the color measurer 154D obtains the correction coefficient with respect to the measured distance based on the distance-intensity data in which the ratio of change in the intensity of light received by the light receiver 172B to the distance between the medium A and the spectroscope 17 (correction coefficient) is recorded and corrects the intensity of received light with the correction coefficient. In such a configuration, the intensity of received light can be easily corrected based on the preset distance-intensity data.

The distance-intensity data is set for each measured wavelength, and the color measurer 154D corrects the intensity of received light based on the distance-intensity data corresponding to the measured wavelength.

Accordingly, the intensity of received light can be accurately corrected for each measured wavelength, and colorimetry accuracy can be further improved. That is, in the present embodiment, for a measured wavelength, if an intensity of light received by the light receiver 172B is different due to the change in distance between the medium A and the spectroscope 17, the measured value can be corrected by using an appropriate correction coefficient corresponding to each measured wavelength.

The present embodiment uses a wavelength-selective interference filter (wavelength-selective Fabry-Pérot etalon element) as the spectroscopy element. Thus, low cost and size reduction can be promoted in comparison with a case where other spectroscopy elements such as an AOTF and an LCTF are used, and the cost and size of the spectrometry device are decreased.

In the present embodiment, the spectroscope 17 is mounted in the printer 10 that includes the printing unit 16 forming an image on the medium A and performs spectrometry on the medium A. The calibrator 154E updates the printing profile data based on the reflectance in each measured wavelength and the intensity of color calculated from the spectrometry result.

In such a printer 10, as described above, high accuracy spectrometry can be performed on the color patches, and a high accuracy colorimetry process can be performed. Therefore, by updating the printing profile data based on the color measurement result from the colorimetry process, the printing unit 16 can form an image in which the intensity of color desired by a user is reproduced with high accuracy.

Other Embodiments

The present disclosure is not limited to each embodiment described above. Modifications, improvements, and configurations obtained by an appropriate combination of each embodiment to the extent capable of achieving the advantage of the present disclosure are to be included in the present disclosure.

For example, while the above embodiment illustrates the distance sensor 18 as receiving light from the light source 171A reflected at the position of measurement R after irradiation, this is not for limitation purposes.

For example, the distance between the medium A and the spectroscope 17 at the position of measurement R may be measured by disposing a separate sensor light source for distance sensor, irradiating the position of measurement R with light from the sensor light source, and receiving reflected light with the distance sensor.

While, in the above embodiment, the color measurer 154D calculates the corrected reference light intensity by dividing the reference light intensity by the correction coefficient corresponding to distance and calculates the distance-corrected measured light intensity by dividing the measured light intensity by the correction coefficient corresponding to distance to calculate the reflectance based on the corrected reference light intensity and the corrected measured light intensity, this is not for limitation purposes. For example, given that the correction coefficient with respect to the distance when the reference light intensity is measured is $k_{\lambda,0}$ and that the correction coefficient with respect to the distance when the measured light intensity is measured is $k_{\lambda,1}$, the color measurer 154D may calculate the reflectance $R_\lambda$ from $R_\lambda = k_0 E_\lambda / k_1 E_{\lambda,0}$ by using the reference light intensity $E_{\lambda,0}$ and the measured light intensity $E_\lambda$.

While, in the above embodiment, the distance-intensity data is set for each measured wavelength and the color measurer 154D obtains the correction coefficient from the distance-intensity data corresponding to the measured wavelength, this is not for limitation purposes. For example, the ratio of change in the total intensity of the illumination light emitted from the light source 171A to the distance between the medium A and the spectroscope 17 (e.g., the amount of displacement from the reference position $A_0$) may be recorded in the distance-intensity data. In this case, one distance-intensity data may be stored in the memory 153.

While, in the above embodiment, distance is measured by the distance sensor 18 by synchronizing the timing of obtaining the measured value (intensity of received light) in each measured wavelength with the timing of obtaining the distance measured by the distance sensor 18, that is, at each timing of obtaining the measured value in one wavelength, this is not for limitation purposes.

For example, distance may be measured by the distance sensor 18 from one color patch only at the timing of obtaining the measured value in the initial one band. For the measured value in the subsequent 15 measured wavelength bands, correction may be performed by using the initially measured distance. In addition, distance measurement may be performed at each predetermined band interval. For example, distance is measured by the distance sensor 18 at the time of spectrometry performed in measured wavelengths of 700 nm, 600 nm, and 500 nm. The correction coefficient corresponding to the distance at the time of obtaining the measured value in 700 nm is applied to the measured wavelength between 620 nm and 700 nm. The correction coefficient corresponding to the distance at the time of obtaining the measured value in the wavelength of 600 nm is used for the measured wavelength between 520 nm and 600 nm. The correction coefficient corresponding to the distance at the time of obtaining the measured value in 500 nm is used for the measured wavelength between 400 nm and 500 nm. Alternatively, for example, the correction coefficient corresponding to the distance at the time of obtaining the measured value in 660 nm may be applied to the measured wavelength between 620 m and 700 nm. The correction coefficient corresponding to the distance at the time of obtaining the measured value in the wavelength of 560 nm may be used for the measured wavelength between 520 nm and 600 nm. The correction coefficient corresponding to the distance at the time of obtaining the measured value in 460 nm may be used for the measured wavelength between 400 nm and 500 nm.

Furthermore, each measured value may be corrected by measuring distance with the distance sensor 18 at the time of obtaining the measured value in the measured wavelength of 700 nm and at the time of obtaining the measured value in the measured wavelength of 400 nm and by obtaining the correction coefficient with respect to the average distance.

While the above embodiment illustrates the distance-intensity data as being stored in the memory 153, this is not for limitation purposes. For example, the distance-intensity data may be stored in the external apparatus 20 connected to the printer 10 and may be obtained from the external apparatus 20 by, for example, wired communication or wireless communication.

While the above embodiment illustrates a configuration in which the unit controller circuit 152 is disposed in the control unit 15, a control unit may be disposed in each unit separately from the control unit 15 as above. For example, a filter controller circuit that controls the wavelength-selective interference filter 5 and a light reception controller circuit that controls the light receiver 172B may be disposed in the spectroscope 17. In addition, a microcomputer and a memory that stores the V-λ data may be incorporated into the spectroscope 17, and the microcomputer may function as the measuring controller 154C.

While the above embodiment illustrates the printing unit 16 as an ink jet type that discharges ink supplied from the ink tank by driving the piezoelectric element, this is not for limitation purposes. For example, the printing unit 16 may discharge ink by generating an air bubble with a heater in the ink or may discharge ink with an ultrasonic vibrator.

This is not limited to an ink jet type and, for example, can be applied to a printer of any printing type such as a thermal printer using thermal transfer, a laser printer, and a dot impact printer.

While the above embodiment illustrates the wavelength-selective interference filter 5 as a light transmitting type that transmits light of a wavelength corresponding to the gap G between the reflecting films 54 and 55 from incident light, this is not for limitation purposes. For example, a light reflecting wavelength-selective interference filter that reflects light of a wavelength corresponding to the gap G between the reflecting films 54 and 55 may be used. In addition, other types of wavelength-selective filters may be used.

While the above embodiment illustrates the spectroscopy device 172A in which the wavelength-selective interference filter 5 is accommodated in the casing 6, for example, the wavelength-selective interference filter 5 may be directly disposed in the spectroscope 17.

While the wavelength-selective interference filter 5 is illustrated as a spectroscopy element, this is not for limitation purposes. For example, a grating, an AOTF, or an LCTF may be used as a spectroscopy element.

While the above embodiment illustrates a configuration (post-dispersive spectroscopy) in which the spectroscopy device 172A including the wavelength-selective interference filter 5 is disposed in the light receiving optical system 172, this is not for limitation purposes.

For example, the wavelength-selective interference filter 5 or the spectroscopy device 172A including the wavelength-selective interference filter 5 may be arranged in the illumination optical system 171, and the medium A may be irradiated with light on which spectroscopy is performed with the wavelength-selective interference filter 5 (pre-dispersive spectroscopy).

While the above embodiment illustrates the printer 10 that includes the spectrometry device, this is not for limitation purposes. For example, the spectrometry device may not include an image forming unit and perform only the colorimetry process on the medium A. The spectrometry device of the present disclosure may be incorporated into, for example, a quality inspecting apparatus that inspects the quality of a printed matter manufactured in a factory or the like, or besides, the spectrometry device of the present disclosure may be incorporated into any apparatus.

While the spectroscope 17 is illustrated by a configuration example in which the medium A is irradiated with light of the light source 171A in the direction of the normal line thereof and light reflected by the medium A at 45° is incident on the wavelength-selective interference filter 5, this is not for limitation purposes.

For example, light may be incident on the surface of the medium A at an angle of 45°, and the light receiver 172B may receive light that is reflected by the medium A in the direction of the normal line thereof through the wavelength-selective interference filter 5.

While the light receiver 172B receives light reflected by the medium A at 45° through the wavelength-selective interference filter 5, the light receiver 172B may receive light that is reflected at an angle other than 45° such as 30°. That is, the angle of the optical axis of the light receiver 172B and the wavelength-selective interference filter 5 may be set so that the light receiver 172B does not receive light that is reflected by the medium A in a specular manner.

Besides, a specific structure in embodying the present disclosure may be configured by appropriately combining the above embodiment and the modification examples to the extent capable of achieving the advantage of the present disclosure and may be appropriately changed to other structures and the like.

The entire disclosure of Japanese Patent Application No. 2015-064978 filed Mar. 26, 2015 is expressly incorporated by reference herein.

What is claimed is:

1. A spectrometry device comprising:
a spectroscope that includes a spectroscopy element on which light from a measurement target is incident;
a distance measurer that measures a distance between the measurement target and the spectroscope; and
a spectrometry unit that performs spectrometry on the light by using the spectroscope,
wherein the spectrometry unit corrects a measured value obtained by the spectrometry based on the distance measured by the distance measurer, and
wherein the spectroscope includes a light source that emits illumination light toward the measurement target, and
wherein the illumination light emitted onto the measurement target is reflected as a first portion of reflected light and a second portion of reflected light, the first portion of reflected light is reflected by the measurement target toward a first direction and is incident to the spectroscopy element, and the second portion of reflected light is reflected by the measurement target toward a second direction different from the first direction and is incident to the distance measurer.

2. The spectrometry device according to claim 1, wherein:
the distance measurer receives the second portion of light reflected by the measurement target and measures the distance between the measurement target and the spectroscope based on the received second portion of light.

3. An image forming apparatus comprising:
the spectrometry device according to claim 2; and
an image forming unit that forms an image on an image formation target.

4. The spectrometry device according to claim 1, wherein:
the spectrometry unit corrects the measured value based on the distance that is measured by the distance measurer at a time at which the measured value from the spectrometry is obtained.

5. An image forming apparatus comprising:
the spectrometry device according to claim 4; and
an image forming unit that forms an image on an image formation target.

6. The spectrometry device according to claim 1, wherein:
the spectrometry unit obtains distance-intensity data in which the amount of change in light intensity is recorded with respect to the distance between the measurement target and the spectroscope, and corrects the measured value based on the distance-intensity data.

7. An image forming apparatus comprising:
the spectrometry device according to claim 6; and
an image forming unit that forms an image on an image formation target.

8. The spectrometry device according to claim 6, wherein:
the spectrometry unit obtains the distance-intensity data that corresponds to each of a plurality of wavelengths and corrects the measured value based on the distance-intensity data that corresponds to a wavelength in which spectroscopy is performed by the spectroscopy element.

9. An image forming apparatus comprising:
the spectrometry device according to claim 8; and
an image forming unit that forms an image on an image formation target.

10. The spectrometry device according to claim 1, wherein:
the spectroscopy element is a wavelength-selective Fabry-Pérot etalon element.

11. An image forming apparatus comprising:
the spectrometry device according to claim 10; and
an image forming unit that forms an image on an image formation target.

12. An image forming apparatus comprising:
the spectrometry device according to claim 1; and
an image forming unit that forms an image on an image formation target.

13. A spectrometry method for a spectrometry device including a spectroscope that includes a spectroscopy element on which light from a measurement target is incident and a distance measurer that measures a distance between the measurement target and the spectroscope, the method comprising:
- performing, by the spectroscope, a spectrometry process on the light to obtain a measured value;
- emitting, by a light source in the spectroscope, illumination light toward the measurement target, wherein the illumination light emitted onto the measurement target is reflected as a first portion of reflected light and a second portion of reflected light, the first portion of reflected light is reflected by the measurement target toward a first direction and is incident to the spectroscopy element, and the second portion of reflected light is reflected by the measurement target toward a second direction different from the first direction and is incident to the distance measurer
- measuring, by the distance measurer, a distance between the measurement target and the spectroscope; and
- correcting the measured value based on the distance measured.

* * * * *